Jan. 13, 1942.                L. REICHOLD                 2,269,689
                    ELECTRIC COOKING VESSEL AND STAND
                    Filed Jan. 8, 1941        3 Sheets-Sheet 1

Ludwig Reichold
INVENTOR

BY Brown + Jones
ATTORNEYS

Jan. 13, 1942.   L. REICHOLD   2,269,689
ELECTRIC COOKING VESSEL AND STAND
Filed Jan. 8, 1941   3 Sheets-Sheet 2

Ludwig Reichold
INVENTOR

BY Brown & Jones
ATTORNEYS

Jan. 13, 1942.  L. REICHOLD  2,269,689

ELECTRIC COOKING VESSEL AND STAND

Filed Jan. 8, 1941  3 Sheets-Sheet 3

Ludwig Reichold
INVENTOR

BY Brown & Jones
ATTORNEYS

Patented Jan. 13, 1942

2,269,689

UNITED STATES PATENT OFFICE 2,269,689

ELECTRIC COOKING VESSEL AND STAND

Ludwig Reichold, Winsted, Conn.

Application January 8, 1941, Serial No. 373,551

17 Claims. (Cl. 219—43)

This invention relates to cooking equipment and more specifically an electrical and internally heated receptacle and circuit controlling support therefor.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide an internally, efficiently heated vessel, the control for the heat of which is in the device which supports the vessel; to provide such a combination in which the vessel is removable from the support in order that the former may be easily washed or otherwise used while the control mechanisms remain behind in the latter; and to provide such a combination in which there is assured, in the control mechanism in the support, sensitiveness to the intensity of the heat in the vessel, and in which contacts exposed, when the vessel is removed, are automatically disconnected from the electric circuit and are automatically connected to an electric circuit when the vessel is placed upon the support, and in which those contacts are triply controlled, i. e., by automatic temperature control, by automatic mechanical control from the vessel and by manual control.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which.

Figure 1:
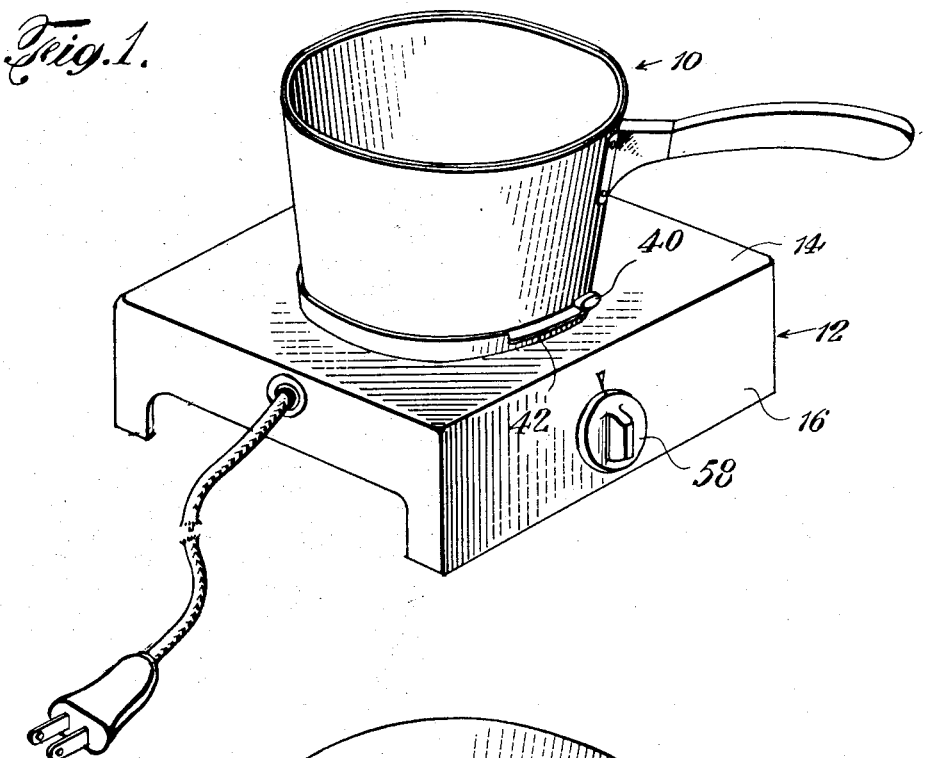
Fig. 1 is a perspective view of a cooking receptacle on a support, said receptacle and support embodying one form of the invention.
Figure 2:
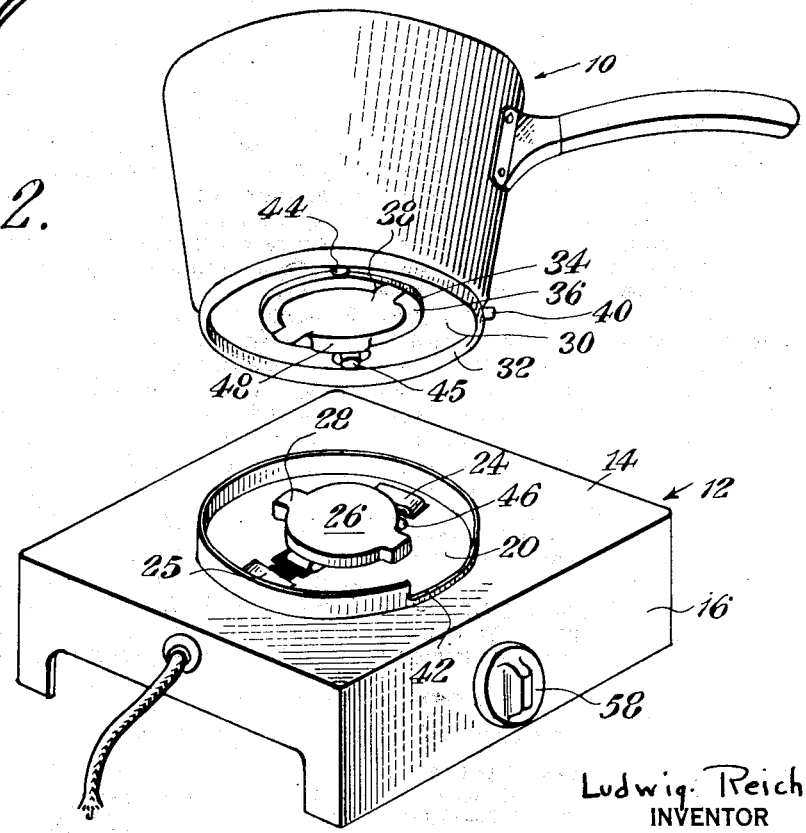
Fig. 2 is a view similar to Fig. 1 but with the cooking receptacle shown spaced above its support and slightly tilted to expose its under surface.

The present invention contemplates an electric cooking utensil which has high heat efficiency and is so safe that there is substantially no danger to the housewife. It is at the same time so simple that the actual receptacle or pot has substantially the appearance and weight of an ordinary receptacle. There are no excrescences on the side of the kettle. The heat is all generated within the wall of the kettle itself. There are no live parts exposed when the kettle is removed from its support, nor are there at any other time. There are no wires attached to the kettle. As a result, the kettle may be used apart from its support as though it were an ordinary cooking utensil. For example, it may be entirely submerged in water while it is being washed.

Not only is the kettle substantially like other kettles, but its operation, in connecting it to its support so that the current is delivered to its interior, is so direct that a housewife, in placing it on its support would automatically obtain a proper connection resulting in the kettle's being firmly locked in position.

The heating element is in the kettle, which makes for maximum heat efficiency. The thermostatic control, however, is in the support. This permits the kettle to be composed of a minimum of parts with a corresponding minimum weight. The means for locking the kettle to its support performs an added function in that it provides a path of almost no heat resistance to the thermostatic control.

There are three separate controls of the electric current in the device. The removal of the kettle automatically disconnects the electrodes in the support which deliver current to the vessel so that they are no longer alive. The thermostat shuts off the current at one or more predetermined temperatures of vessel. There is also a manual switch.

In the drawings, 10 denotes a receptacle in which material is to be heated. This usually takes the form of a kitchen kettle. The kettle is adapted to be placed upon support 12, which has a flat top 14 and may have lugs 16. There is an opening in the top 14, in which is positioned the current control mechanism. The latter may comprise an outer band of suitable material, such as metal. It is supported in any convenient fashion, as by welding to the top 14. It has a flange 18 which rises above the level of the top 14. Attached to the outer band is a disc 20, which is at about the height of the top 14, and except for openings within itself, it occupies all of the space within the outer band. It is preferably of an electrically insulating material. Resiliently mounted electrodes 24 and 25 extend through openings in the disc and press themselves slightly above the level of the disc. A circular element 26 having ears 28 is positioned centrally of the disc and extends through and slightly above it. This element provides a path for heat to pass from the kettle 10 to the thermostatic control elements below, and its ears cooperate with elements on the bottom of the kettle to draw the bottom of the latter into tight contact with the element 26.

Attached to the bottom of the kettle is an annular element 30, which is preferably of metal. Its outer edge is turned down to form 32, of radius such that it just seats in the flange 18, which extends up from the support 12. The radially inward portion of annulus 30 is formed to provide another downward extending flange 34, from the bottom of which there extends radially inward and parallel with the bottom of the kettle a ledge 36. There are two cut away sections 38 in this ledge 36. When the kettle is placed so that the flange 32 seats in the flange 18, the two cut away portions 38 of the ledge 36 seat down around the ears 28. When the kettle is rotated about a vertical axis through its center the ledge 36 slides along with the ears 28 between the ledge and the kettle bottom, whereby the kettle becomes attached to its support and is secured thereagainst by the ears. The ledge 36 adjacent the opening 38 therein may be made to slope slightly so as to pull the kettle down tightly against element 26 as the kettle is rotated with respect to the fixed ears.

If desired, there may be a lug 40 attached to the flange 32 and adapted to seat at one end of a cut away portion 42 of the flange 18, which rises from the table 12. This lug may act as an index to indicate to a user how to orient the kettle so that it may be placed with the cut away portions 38 exactly above the ears 28. The user knows e. g., that to attach the kettle the lug is positioned at the right-hand end and then the kettle is rotated as far as the opening 42 will permit the lug 40 to move, by which time the ledge 36, in cooperation with the ears 28, will draw the kettle down tightly into position. The edge of portion 42 of the flange may be somewhat sloped to assist in bringing ledge 36 tightly against ears 28. Contacts 44, which extend down through the bottom of the kettle and the annulus 30, make electrical contact with the resiliently mounted contacts 24 in the controlling mechanism.

An electric depressible switch element 46 extends up through the insulating block 20, and is operated by a rim-like cam 48, which extends down from the bottom of the kettle. As shown, this cam is attached to the inner edge of the ledge 36. As will be described below, the electric potential is not brought to the contacts 24 until switch 46 has been depressed, and the cam 48 is so positioned on the bottom of the kettle that it does not operate the switch 46 until the ears 28 and ledge 36 have finally brought the kettle into its firm final position. Similarly, when the kettle is to be rotated in the reverse direction and released from its support, the cam 48 permits the resiliently depressible switch 46 to move to a position shutting off the current before the kettle has been turned far enough for it to be raised clear of the ears 28.

Heat is supplied to the vessel through an electric resistance 50, which extends between the electrodes 44 and 45 and within the walls of the vessel. As shown, the heating element 50 lies between the outer and inner walls 52 and 54 of the floor of the vessel. Any necessary insulation is provided. The heating element may be positioned annularly toward the outer walls of the vessel. This permits the outer and inner walls at the center of the floor of the vessel to be in contact with the outer walls somewhat higher in this central portion than where it is beneath the heating element 50. There is thus formed an upwardly extending concavity 56, into which the element 26 of the control mechanism may seat.

Figure 3:
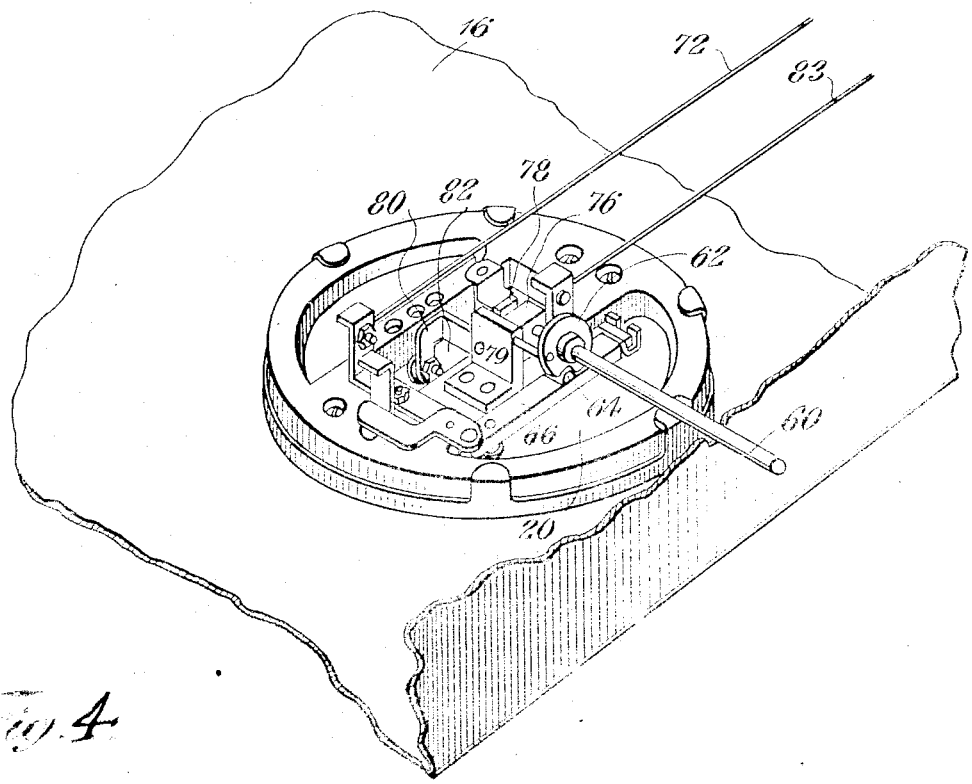
Fig. 3 is a perspective view of the under side of the receptacle support, the latter being shown in inverted position.
Figure 4:
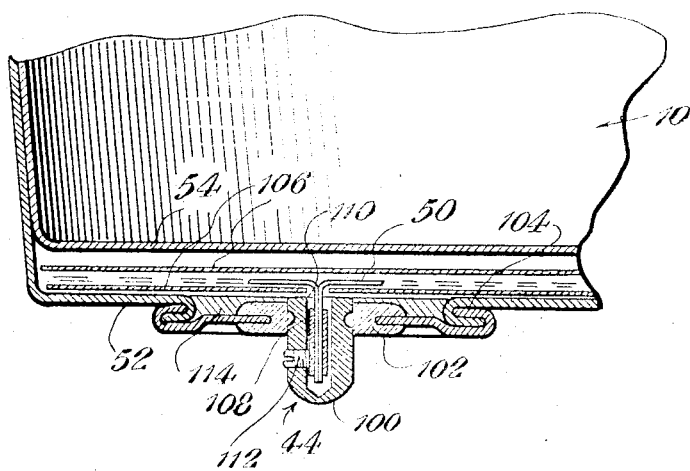
Fig. 4 is a cross section of an electrical contact in the bottom of the receptacle.
Figure 5:
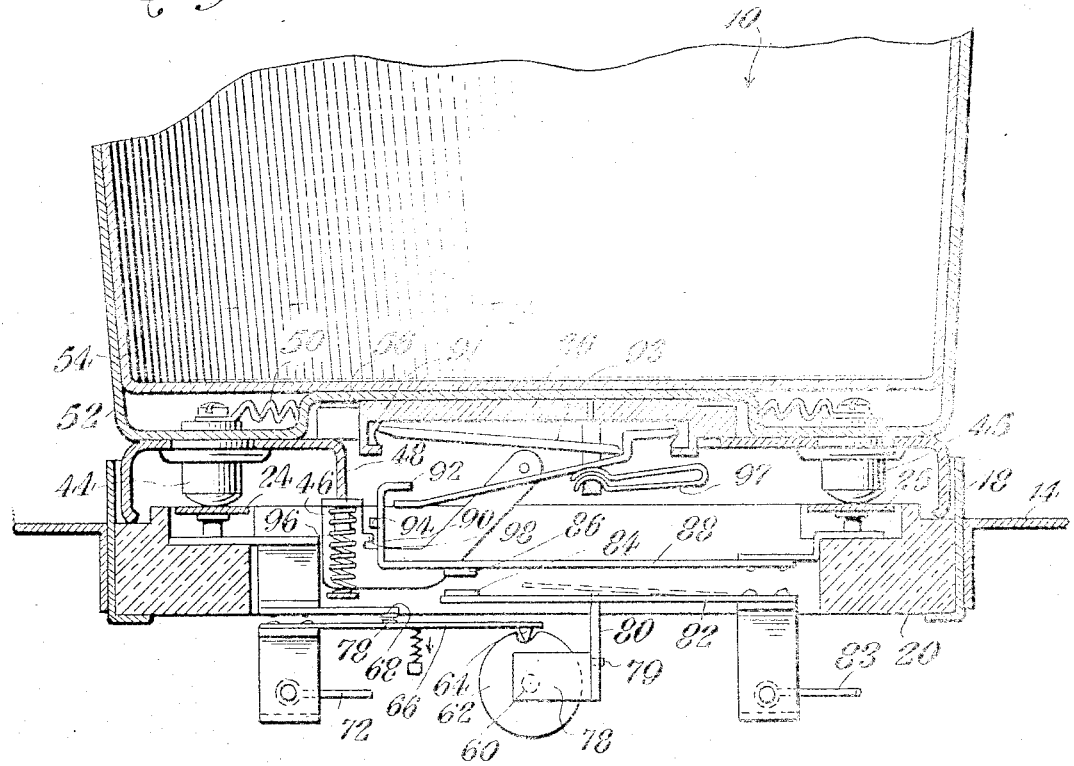
Fig. 5 is a vertical cross section of the receptacle and support shown in Fig. 1.

This control mechanism (see Figs. 3 and 5) is carried by the insulating block 20, and comprises the two electrodes 24 and 25, together with the means for disconnecting them from the source of potential. A hand-operated rotatable knob 58 is positioned outside the support 12, and is carried by a shaft 60, to which is fixedly attached a cam 62. The latter cooperates with a cam member 64 on a pivoted arm 66. The cam and cam member hold the arm 66 in such a position that contacts 68 and 70 are separated when the knob is in "off" position. Contact 70 is connected by conductor 72 to an outside source of supply. Contact 68 is connected to electrode 24. Thus, in the "off" position of the knob, there is no impressed potential on electrode 24.

A threaded sleeve 74 on shaft 60 passes through a threaded opening in a fixed support 76. A rotation of the knob and shaft therefore causes a slight axial displacement of the shaft. The end of the shaft 60 abuts against one arm 78 of a bell crank, the other arm 80 of which presses against a flat metallic spring member 82, which carries contact 84. When the knob is in "off" position the shaft and bell crank are so arranged that the resilient member 82 holds contact 84 away from another contact 86. Since contact 84 is directly connected by lead 83 to an outside source of potential and since contact 86 is directly connected to electrode 25, it will be seen that for the "off" position of the knob electrode 25, like electrode 24, has no potential impressed thereon. When the knob is turned to the "on" position, cam 62 operates arm 66 to bring contacts 68 and 70 toward each other, and shaft 60 pushes the bell arm 78 around its pivot to press contacts 84 and 86 together. In this fashion potential is delivered to electrode 24, but electrode 25 does not receive potential until contacts 84 and 86 are finally caused to meet by the placing of the kettle on the support, as will be next described. The lead 72 may be connected to the ground side of the circuit, so that the potential impressed upon electrode 24 is zero.

Contact 86 is on lead 88, which may be a spring, the end of which has a vertical extension 90. Two horizontal fingers 92 and 94 are attached to extension 90. A spring 96 tends to hold the end of the pivoted member 46 above the level of the block 20. Finger 98 on member 46 cooperates with finger 94 on spring 88 to hold it and its attached contact 86 in spaced relation with contact 84. When cam 48 on the kettle presses member 46 down, finger 98 is depressed and finger 94 no longer holds spring 88 and contact 86 away from contact 84, and the resiliency of the spring 88 causes contact 86 to move into contact with contact 84. Thus finally, an electric connection is made between lead-in 83 through parts 82, 84, 86 and 88 to electrode 25. Pivoted member 46 may similarly hold contact 68 away from contact 70 until said member is operated by cam 48.

The thermostatic control includes the disc 26 which has a flange 91 on its edge and extending in a direction away from the vessel 10. A thrust bar 93 slightly inclined with respect to the plane of the disc has two oppositely beveled extremities one of which pivotally engages a notch on the inside of flange 91. A third class lever 95 having a reentrant angle bend has its shorter end provided with a beveled extremity fulcrumed in a notch in flange 91. The other end of thrust bar 93 seats in said angle bend. The thrust bar 93 and the short end of the lever 95 form two short sides of a triangle, of which disc 26 is the hypotenuse. The thrust bar 93 and lever 95 are preferably of a metal or metals having a thermal coefficient of expansion somewhat lower than the material of the disc 26. Consequently, when the disc expands due to heat transmitted to it from the vessel 10, the bar 93 and lever 95 swing toward the disc against spring 97. The free end of lever 95 undergoes a motion greatly magnified compared to the expansion of disc 26.

Figure 6:
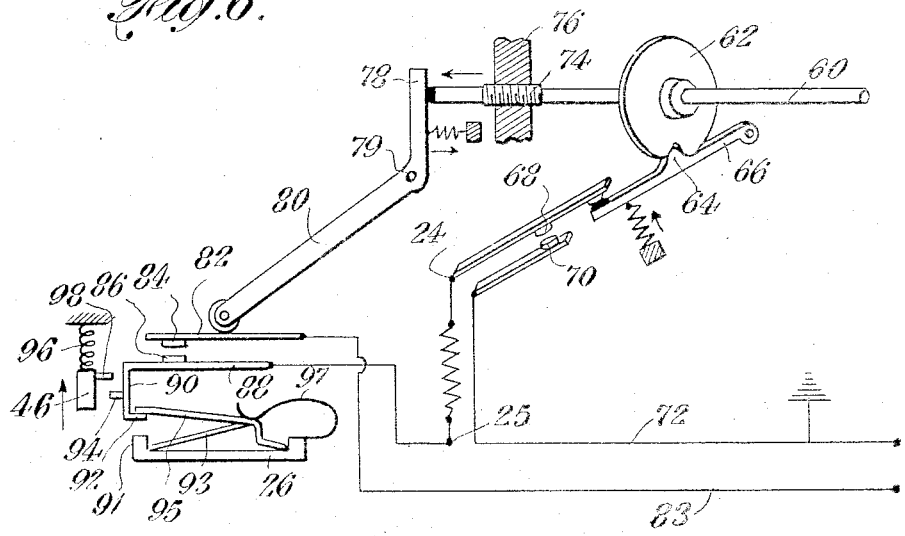
Fig. 6 is a diagrammatic representation of the electric circuit with a few associated parts.

When the temperature of the kettle and hence of the disc has been raised to a certain value the free end of lever 95 comes into contact with finger 92, moving it and the spring 88 and the contact 86 attached to the spring 88 away from contact 84. This disconnects electrode 25 from the source of potential and the electric current ceases to flow through the heating element in the kettle. As the latter cools, the parts return to their former position and current once again flows through the heating element. The diagram in Fig. 6 shows the parts with the switch element 46 pushed by a vessel (not shown) against spring 96, so that finger 98 does not interfere with finger 94. Spring lead 88 would, therefore, be free to move contact 86 against contact 84, except that the parts are shown at the high temperature cut-off position, i. e., the lever 95 under the action of spring 97 has pulled spring lead 88, by means of the finger 92, away from contact 84.

Certain of the parts already described permit the user of the kettle to determine at what temperature the latter is to be maintained. After the knob 58 has been turned to "on" position, it may be turned farther, thereby causing the shaft 60 to move farther axially to any desired point. The bell crank arm 78 is accordingly rotated farther about its pivot 79, causing the other arm 80 of the bell crank to push spring 82 and the contact 84 thereon farther against spring 84. This in turn moves the finger 92 nearer the thermostat disc 26. In the event the disc must become just so much hotter before the lever 95 can reach finger 92 to raise it and contact 86 off from contact 84. Therefore the position of the knob determines at what temperature of the kettle 10 the heating current is to be turned off. An index (not shown) on the knob and a dial associated therewith (also not shown) inform the user where to position the knob to obtain the kettle temperature desired. The dial may be marked, for example, "low, simmer, boil, high, off" or in any convenient fashion.

The heating element 50 is positioned in a water tight compartment between walls 52 and 54 of the vessel. Electrodes 44 and 45, to which the heating element is attached, extend through and form a water tight joint with the outer wall 52. Each comprises a central metal plug 100 for carrying the current, an insulating annulus 102, preferably of glass-like material and attached surroundingly to, as by being imbedded in, plug 100, and a larger annulus 104 attached surroundingly to, as by being imbedded in, annulus 102. The latter annulus 104 has its outer edge folded into the folded edge of an opening in wall 52, or its outer edge may be welded into the edge of the opening in wall 52. The walls 52 and 54 may be quite close together, especially if the heating element 50 is in the form of a thin strip placed between layers 106 of mica. The heating element may be in parallel between the two electrodes 44 and 45. In that case, or if desired, the two ends of the heating element may be brought down into a conducting sleeve 108, in a central cavity 110 in the plug 100. A set-screw 112 may insure contact between the metal of the plug and the ends of the heating element 50. The set-screw may be water tight or there may be a water tight material placed over its outer end. If desired, there may be a cementitious material 114 placed between the annulus 102 and the folded portion of the rim 104.

The device described above can be constructed of elementary durable parts. It can be quickly serviced. It is completely safe, as no exposed parts ever have an impressed potential. It is so simple that it can be operated by a child.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Cooking equipment comprising a support, a vessel having an electric heating element permanently associated therewith, said vessel being adapted to be supported by said support and to be removed therefrom, an electric circuit for supplying electric energy to said element, a mechanism which is responsive to heat received by said mechanism and which is associated with said support and positioned to receive heat from said vessel whereby it is responsive to temperature changes in said vessel, said mechanism being adapted for controlling said supplied energy.

2. A cooking equipment, comprising a direct electric heated cooking vessel and a cooperating base therefor, with which the said vessel is removably associated, current introduction means for said vessel, a supply circuit including same means, current connection contacts for the vessel provided in said base and adapted to cooperate with the said current introduction means of the vessel when the vessel is positioned on the base, and safety interrupting means external to said supply circuit, for maintaining said contacts under tension when the vessel is in its operable position on said base, and for freeing at least one of said contacts of tension when the vessel is removed to its inoperable position, away from said base, and means wholly separate from said supply circuit for operating said safety interrupting means.

3. A cooking equipment, comprising a direct electric heated cooking vessel and a cooperating base therefor, with which the said vessel is removably associated, current introduction means for said vessel, a supply circuit including same means, current connection contacts for the vessel provided in said base and under the bottom of the vessel when the vessel is positioned on the base and adapted to cooperate with the said current introduction means of the vessel when the vessel is positioned on the base, and safety interrupting means external to said supply circuit, for maintaining said contacts under tension when the vessel is in its operable position on said base, and for freeing at least one of said contacts of tension when the vessel is removed to its inoperable position, away from said base and consisting of mechanical elements, adapted to be moved by a motion of said vessel, for directly and mechanically disconnecting at least one of said contacts from said circuit.

4. A cooking equipment comprising a direct electric cooking vessel and a cooperating base therefor, with which said vessel is removably associated, an electric supply circuit in said base and leading to contacts in said base, electrode means on said vessel positioned to receive current from said contacts, means tending to hold one of said contacts out of said circuit and means, other than said electrode means, associated with said vessel and positioned to operate on the last mentioned means, after said electrode means are in contact with said contacts, for putting said one contact into said circuit.

5. Cooking equipment comprising a support, a vessel having an electric heating element permanently associated therewith, said vessel being adapted to be supported by said support and to be removed therefrom, an electric circuit for supplying electric energy to said element, a mechanism which is responsive to heat received by said mechanism and which is associated with said support and positioned to receive heat from said vessel whereby it is responsive to temperature changes in said vessel, said mechanism being adapted for controlling said supplied energy, a heat transfer element associated with said support and means associated with said vessel and said support for causing said vessel and said element to be brought into tight contact when said vessel and said support undergo relative rotation.

6. Cooking equipment comprising a support, a vessel having an electric heating element permanently associated therewith, said vessel being adapted to be supported by said support and to be removed therefrom, an electric circuit for supplying electric energy to said element, a mechanism which is responsive to heat received by said mechanism and which is associated with said support and positioned to receive heat from said vessel whereby it is responsive to temperature changes in said vessel, said mechanism being adapted for controlling said supplied energy, a heat transfer element associated with said support and means associated with said vessel and said support for causing said vessel and said element to be brought into tight contact when said vessel and said support undergo a motion other than a motion of direct approach to each other.

7. A cooking equipment support comprising an electrically insulating element having a substantially horizontal upper surface adapted to receive cooking equipment thereabove and having a plurality of apertures therein and opening out through said surface, a plurality of electrical contacts extending from the under side of said element at least toward the plane of said apertures, and a heat-transfer element attached to said support in the vicinity of said insulating element said insulating element being formed of electrically non-conductive material.

8. A cooking equipment support comprising an electrically insulating plate having a substantially horizontal upper surface and having a plurality of apertures therethrough, a plurality of resiliently mounted electrical contacts in said apertures, and a heat transfer plate, attached to said support in the vicinity of the surface of said electrically insulating plate, said insulating plate being formed of electrically non-conductive material.

9. A cooking equipment support comprising an electrically insulating element having a plurality of apertures therein, a plurality of electrical contacts extending from the under side of said element at least toward the plane of said apertures, a heat-transfer element attached to said support in the vicinity of said insulating element, and means for assisting in positioning a piece of cooking equipment in tight contact with said heat-transfer element said insulating element being formed of electrically non-conductive material.

10. A cooking equipment support comprising an electrically insulating element having a plurality of apertures therein, a plurality of electrical contacts extending from the under side of said element at least toward the plane of said apertures, a heat-transfer element attached to said support in the vicinity of said insulating element, an electric-circuit switch element positioned near one of said apertures and adapted to be operated through said one aperture by an element on a piece of cooking equipment.

11. A vessel comprising an electric heating element permanently associated therewith, means for at least assisting in positioning a portion of said vessel in tight contact with heat-transfer means and a protuberance from said vessel for mechanically operating a switch in an electric circuit leading to said electric heating element.

12. A cooking equipment support comprising a plurality of contacts for connecting with an electric circuit in a piece of supported equipment, means providing a portion of an electric circuit for said contacts but not including said contacts, manually operated means for breaking said portion, means for breaking said portion and operable by a piece of cooking equipment, and means responsive to temperature changes for breaking said portion.

13. A cooking equipment support comprising a plurality of contacts for connecting with an electric circuit in a piece of supported equipment, means providing a portion of an electric circuit for said contacts, manually operated means for breaking said portion adjacent one of said contacts, whereby said contact is not connected to a source of power when said portion is so broken, means for breaking said portion adjacent another of said contacts, whereby said other contact is not connected to a source of power when said portion is broken by the second-mentioned breaking means, the second-mentioned breaking means being operable by a piece of cooking equipment, and means responsive to temperature changes for breaking said portion.

14. A cooking equipment, comprising a direct electric heated cooking vessel and a cooperating base therefor, with which the said vessel is removably associated, current introduction means for said vessel, a supply circuit including same means, current connection contacts for the vessel provided in said base and adapted to cooperate vessel when the vessel is positioned on the base, and mechanically-operated safety means for freeing said contacts of tension when the vessel is removed to its inoperative position away from said base and heat-responsive means in said base for freeing said contacts of tension when said vessel is above a predetermined temperature.

15. A cooking equipment comprising a direct electric cooking vessel and a cooperating base therefor, with which said vessel is removably associated and which has a horizontal, perforated, electrically-insulating plate, an electric supply circuit in said base and having switch means therein and leading to contacts attached to said base and associated with said perforations, electrode means on said vessel positioned to receive current from said contacts, other means on said vessel for operating said switch means after said electrodes have been brought into contact with said contacts, a thermostat associated with said base for shutting off said current when said thermostat is above a predetermined temperature, a heat-transfer element associated with said base for transfering heat from said vessel to said thermostat, clamping means for giving said vessel a tight contact with said element.

16. A cooking equipment comprising a direct electric cooking vessel and a cooperating base therefor, with which said vessel is removably associated, an electric supply circuit in said base and leading to contacts in said base, electrode means on said vessel positioned to receive current from said contacts, manually operable switch means attached to said base for disconnecting each of said contacts from said circuit, and other means on said base tending to hold one of said contacts out of said circuit.

17. A cooking equipment comprising a direct electric cooking vessel and a cooperating base therefor, with which said vessel is removably associated, an electric supply circuit in said base and leading to contacts in said base, electrode means on said vessel positioned to receive current from said contacts, heat-responsive means attached to said base for making and breaking said circuit, manually operable switch means attached to said base for disconnecting each of said contacts from said circuit and for regulating said heat-responsive means, and other means on said base tending to hold one of said contacts out of said circuit.

LUDWIG REICHOLD.